(12) United States Patent
Regler et al.

(10) Patent No.: US 9,126,296 B2
(45) Date of Patent: Sep. 8, 2015

(54) HONING MACHINE COMPRISING A DEVICE FOR THE MECHANICAL SURFACE MACHINING OF WORKPIECES

(75) Inventors: Roland Regler, Georgensgmuend (DE); Henning Klein, Stuttgart (DE)

(73) Assignee: Kadia Produktion GmbH + Co. (DE)

( * ) Notice: Subject to any disclaimer, the term of this patent is extended or adjusted under 35 U.S.C. 154(b) by 180 days.

(21) Appl. No.: 13/399,639

(22) Filed: Feb. 17, 2012

(65) Prior Publication Data

US 2012/0214387 A1 Aug. 23, 2012

(30) Foreign Application Priority Data

Feb. 17, 2011 (DE) .......................... 20 2011 003 069

(51) Int. Cl.
*B24B 33/00* (2006.01)
*B23Q 1/01* (2006.01)
*B23Q 39/02* (2006.01)
*B23Q 39/04* (2006.01)
(Continued)

(52) U.S. Cl.
CPC .............. *B23Q 1/015* (2013.01); *B23Q 39/028* (2013.01); *B23Q 39/044* (2013.01); *B24B 27/0046* (2013.01); *B24B 33/02* (2013.01)

(58) Field of Classification Search
CPC ..... B23P 23/02; B23P 21/006; B23Q 39/042; B23Q 39/046; B23D 31/003
USPC ............. 451/294, 5, 119–121, 149, 150, 155, 451/163, 164, 331–333, 51, 80, 84, 109, 451/413, 181, 403; 82/117; 29/888.075, 29/38 A, 38 C, 785
See application file for complete search history.

(56) References Cited

U.S. PATENT DOCUMENTS 1,360,175 A 11/1920 Bullard
1,907,550 A * 5/1933 Knowles ....................... 29/38 C
(Continued)

FOREIGN PATENT DOCUMENTS

DE 195 28 341 C1 10/1996
DE 101 35 233 A1 2/2003
(Continued)

OTHER PUBLICATIONS

Search Report issued in connection with corresponding European Patent Application No. 12 15 3975 dated May 31, 2012.
(Continued)

*Primary Examiner* — Joseph J Hail
*Assistant Examiner* — Brian Keller
(74) *Attorney, Agent, or Firm* — Akerman LLP

(57) ABSTRACT

A honing machine comprises a machining unit for honing equipped with a tool spindle. It includes a machine base with an upper side and an upper machine part with an underside. The upper machine part has a vertical column, which has on its outer surface in an upper column region devices for receiving the machining unit that is equipped with a tool spindle. The machine further comprises an annular table with an underside, the annular table being arranged around the column in a lower column region and having a device carrier, which is rotatable about a vertical axis of rotation, for receiving at least one workpiece receiving device. The annular table and the upper machine part are respectively arranged with their underside on the upper side of the machine base and are mounted fixedly in place on the machine base.

18 Claims, 3 Drawing Sheets

(51) Int. Cl.
  *B24B 27/00*    (2006.01)
  *B24B 33/02*    (2006.01)

(56) References Cited

U.S. PATENT DOCUMENTS

| | | | | |
|---|---|---|---|---|
| 1,911,303 | A * | 5/1933 | Brown, Jr. | 408/34 |
| 2,023,779 | A * | 12/1935 | Bullard | 29/38 A |
| 2,270,590 | A * | 1/1942 | Johnson | 451/28 |
| 2,540,186 | A * | 2/1951 | Bullard et al. | 29/38 A |
| 3,688,363 | A * | 9/1972 | Thobroe et al. | 29/38 A |
| 3,722,049 | A * | 3/1973 | Itin et al. | 29/38 A |
| 4,168,826 | A * | 9/1979 | Rottler | 269/73 |
| 4,422,265 | A * | 12/1983 | Branston | 451/147 |
| 4,473,937 | A * | 10/1984 | Ortlieb | 483/1 |
| 4,523,359 | A * | 6/1985 | Gippa | 29/38 A |
| 4,644,635 | A * | 2/1987 | Murai et al. | 483/54 |
| 4,862,569 | A * | 9/1989 | Buzzi | 29/38 C |
| 5,016,399 | A * | 5/1991 | Vinson | 451/269 |
| 5,906,539 | A * | 5/1999 | Tabel | 451/403 |
| 6,081,986 | A * | 7/2000 | Miyano | 29/563 |
| 6,163,735 | A * | 12/2000 | Yamada et al. | 700/193 |
| 7,226,403 | B2 * | 6/2007 | Konvicka et al. | 483/14 |
| 7,243,407 | B2 * | 7/2007 | Daris | 29/38 C |
| 8,066,548 | B1 * | 11/2011 | Elie et al. | 451/11 |
| 2001/0011055 | A1 * | 8/2001 | Kuriki et al. | 483/16 |
| 2003/0121138 | A1 | 7/2003 | Ooe et al. | |
| 2003/0183635 | A1 * | 10/2003 | Fujii et al. | 220/345.1 |
| 2004/0178184 | A1 * | 9/2004 | Bankstahl et al. | 219/133 |
| 2004/0190993 | A1 * | 9/2004 | Archer-Simms et al. | 405/110 |
| 2005/0060879 | A1 * | 3/2005 | Kumeth | 29/785 |
| 2006/0089087 | A1 * | 4/2006 | Koch | 451/11 |
| 2006/0277734 | A1 * | 12/2006 | Daris | 29/38 C |
| 2009/0053004 | A1 * | 2/2009 | Yamaura et al. | 409/165 |
| 2009/0263204 | A1 * | 10/2009 | Takashima et al. | 409/231 |
| 2010/0029179 | A1 * | 2/2010 | Cloutier et al. | 451/9 |

FOREIGN PATENT DOCUMENTS

| | | |
|---|---|---|
| DE | 101 60 280 A1 | 6/2003 |
| EP | 0 499 653 A1 | 8/1992 |
| GB | 2 383 283 A | 6/2003 |

OTHER PUBLICATIONS

Search Report issued in connection with German Application No. 20 2011 003 069.5.

Office Action issued in connection with corresponding Chinese Patent Application No. 201210036175.9 dated Feb. 12, 2015.

* cited by examiner

HONING MACHINE COMPRISING A DEVICE FOR THE MECHANICAL SURFACE MACHINING OF WORKPIECES

This application claims the benefit of German Utility Application No. 20 2011 003069.5 filed on Feb. 17, 2011. The disclosure of this application is incorporated herein in its entirety by reference.

BACKGROUND

The invention relates to a honing machine comprising a device for the mechanical surface machining of workpieces by honing.

Honing is classified among the cutting production processes in which material removal takes place at the workpiece surface by means of a geometrically undefined cutting edge. For this purpose, honing sticks or honing stones in which the abrasive material is bound are provided in a honing tool. With the aid of the honing tool, which may be intended in particular for machining cylindrical holes, such as for example cylinder running surfaces, fine surface machining or finishing is possible. It is characteristic of honing that a rotary cutting movement is superposed by a translatory cutting movement. For driving the honing tool and for producing this cutting movement, a honing machine has respectively corresponding drive devices. The honing tool is usually arranged on a honing spindle, which transfers the rotary and translatory cutting movement produced to the honing tool. For receiving the workpieces to be worked, workpiece receiving devices are provided.

Various constructional concepts for devices for mechanical surface machining are known from the prior art. Known inter alia are circular-table machines, in which a circular table is used as a transfer device for transporting the workpieces between individual machining stations. By means of the circular table, which is rotatable about a vertical axis, the workpieces can be transferred from one machining unit to the next without having to be re-chucked. With circular-table machines it is possible for a number of workpieces in one chucking setup to be fed to different operations or for a number of workpieces to be simultaneously worked identically, depending on the machining units. For example, it is possible for workpieces to be milled, drilled and honed in one chucking setup.

In DE 101 60 280 A1 a description is given of a circular-table machine for mechanical surface machining which has an intermittently driven circular table on which a number of rotatable workpiece receiving devices can be arranged with a predetermined angular division. The circular table is arranged as a ring-shaped table or as an annular table around a vertical column on which a number of machining units are arranged, likewise with a fixed angular division. The machining units are respectively fastened circumferentially to the outside of the column above an annular table plane in an upper column region. The annular table is rotatably mounted on the column by means of a corresponding bearing in a lower column region and can be driven by means of an electromechanical rotary drive or a numerically controlled direct drive. Rolling bearings and/or plain bearings may be used as bearings.

Since the workpieces are arranged on the annular table for the production process by means of the workpiece receiving devices, but the machining units are fastened to the column, to achieve high accuracies in the surface machining it is necessary to align the annular table and the machining units precisely with one another both in the vertical direction and in the radial direction. This means that the positions of the machining units, in particular in the vertical direction, are dependent on the actual position of the annular table in the assembled state, and vice versa. The positioning or alignment of the annular table in the radial direction is also laborious, since the annular table must on the one hand be firmly connected to the column to take the force of its weight, but on the other hand is intended to be aligned as coaxially and concentrically as possible in relation to the column.

SUMMARY OF THE INVENTION

The problem addressed by the invention is that of providing a honing machine comprising a flexible and simple-to-assemble, easy-to-maintain device for mechanical surface machining. In particular, it is intended to reduce the production effort involved in assembly with regard to alignment in comparison with conventional devices.

As a solution to this problem, the invention, according to one formulation, provides a honing machine comprising:

a machining unit for honing equipped with a tool spindle, the honing machine being formed as an annular-table honing machine and comprising a device for the mechanical surface machining of workpieces by honing, the device comprising: a machine base with an upper side, an upper machine part with an underside, the upper machine part having a vertical column, which has on its outer surface in an upper column region devices for receiving at least one machining unit for mechanical surface machining that is equipped with a tool spindle, and an annular table with an underside, the annular table being arranged around the column in a lower column region and having a device carrier, which is rotatable about a vertical axis of rotation, for receiving at least one workpiece receiving device, wherein the annular table and the upper machine part are respectively arranged with their underside on the upper side of the machine base and are mounted fixedly in place on the machine base.

Advantageous refinements of the invention are the subject of the dependent claims. The wording of the claims is made the content of the description by reference.

The honing machine comprises a device for the mechanical surface machining of workpieces by honing. The device comprises a machine base, an annular table and an upper machine part. The machine base has an upper side, on which the annular table and the upper machine part are respectively arranged with their underside and mounted fixedly in place.

The upper machine part has a vertically arranged column with an upper column region and a lower column region. The column has on its outer surface in the upper column region devices for receiving at least one machining unit for mechanical surface machining that is equipped with a tool spindle, for example for receiving a machining unit for honing.

The annular table is arranged around the column in the lower column region and has a device carrier, which is rotatable about a vertical axis of rotation, for receiving at least one workpiece receiving device. When the device is fully assembled, the device carrier is detachably fastened to a rotatable part of the circular table, i.e. to the rotor thereof. For driving the device carrier, corresponding drive devices are provided, the device carrier preferably being driven in a numerically controlled manner.

In the case of the device, it is not the column but the machine base that carries most of the weight, or the entire weight, of the annular table. Consequently, the column need not perform any supporting function, or any significant supporting function, for the annular table and can be designed in a functionally optimized manner, and possibly with smaller dimensions.

Furthermore, the device makes it possible for the annular table and the upper machine part to be assembled independently, and consequently in a simplified manner, since the circular table can be arranged independently of the upper machine part with the machining units fastened thereto on the machine base, aligned and assembled there. Consequently, the assembly and precise alignment of the machining units in relation to the annular table no longer require that the annular table is first assembled and the actual position thereof determined. There is no need for the laborious alignment of the annular table and the machining units in relation to one another, in particular in the vertical direction, and the assembly of the annular table on the column of the upper machine part.

In a refinement, the machine base has on its upper side a base reference area as a common vertical reference area for the annular table and the upper machine part. The base reference area is preferably a planar area. In this case, the annular table and the upper machine part are respectively arranged with their undersides directly on this base reference area, both the vertical position of the annular table and the vertical position of the upper machine part being determined by the base reference area. This also defines the position of the annular table in the vertical direction in relation, to the upper machine part.

By means of the common base reference area, a reference in the vertical direction between the annular table and the upper machine part can be established in an easy manner and a simple vertical alignment of the annular table and the upper machine part in relation to one another is made possible. The base reference area of the machine base preferably forms the only reference for the vertical alignment of the annular table and the upper machine part.

The common reference area makes it possible that the annular table and the upper machine part can be preassembled independently of one another and subsequently arranged on the machine base independently of one another, but nevertheless can be aligned precisely in relation to one another. The annular table may be arranged on the machine base and connected thereto independently of the column and the machining units. If the machine base and the annular table are preassembled, the upper machine-part then need only be arranged on the machine base and connected thereto. The vertical alignment of the upper machine part is very easy as a result of the base reference area, and the accuracy requirements imposed on the device can be met with greatly reduced effort, in particular with reduced production and assembly effort.

In a refinement, the upper machine part is arranged and mounted with the column underside on the base reference area of the machine base. For this purpose, the column has a column underside which forms the underside of the upper machine part. In this case, the column underside forms a reference area of the upper machine part. The column underside is preferably likewise a planar area.

In another refinement, the upper machine part may also have on its underside an adapter device with an underside which then forms the underside of the upper machine part. This may be advantageous in particular with regard to a surface machining of the underside or the reference area, of the upper machine part, since under some circumstances easier machining of the reference area of the upper machine part is possible.

In an advantageous refinement, the column is completely above the base reference area and does not extend into a region below it. Consequently, a region below the base reference area in the machine base is not occupied by part of the column and can be used for other purposes, for example to accommodate units such as for example pumps, compressors, control systems or the like.

In a development, the machine base has a reference plate on its upper side. In this case, an upper side of the reference plate at least partially forms the base reference area. In particular with regard to the horizontal alignment and/or the vertical positioning of the base reference area, it may be advantageous if the machine base has a reference plate. The reference plate is in this case preferably mounted in the machine base such that it can be adjusted in height. The machine base preferably has aligning devices, which make an exact horizontal alignment of the reference plate possible.

In a development, the device has in the lower column region between the upper machine part and the annular table a fit in the radial direction, that is to say transversely or perpendicularly in relation to the axis of rotation of the device carrier or in relation to a longitudinal direction of the column. The fit, which is preferably formed by a partial area on the inside of the annular table and a partial area on the outside of the column, allows a radial reference to be established between the column and the annular table or between the upper machine part and the machine base which the annular table. A fit is understood as meaning a connection or an arrangement of two parts engaging in one another or butting against one another, both parts being of the same nominal size, but possibly differing in the position and magnitude of their tolerance ranges of the corresponding dimension, in this case their diameter.

In a refinement, the device has locating pins, in order to be able to position and align the annular table and/or the upper machine part respectively in the radial direction easily and exactly on the machine base.

In an advantageous refinement, the column has on its outer side a number of annular grooves running horizontally at different heights. The annular grooves serve inter alia as a device for receiving the machining units and are preferably formed such that they run around the periphery. The peripheral annular grooves make the flexible arrangement of the machining units possible independently of a fixed angular division and at different heights or vertical positions in relation to the device carrier.

In a development, the annular table and/or the machine base have on their upper side at different radial distances in relation to the axis of rotation of the annular table annular grooves which are formed for receiving and/or positioning the tool receiving devices or other components. The annular grooves are preferably formed such that they run around the periphery and run in particular in a circular or annular manner around the axis of rotation of the circular table, so that they are formed for receiving components independently of a fixed angular division. The annular grooves may, however, also be formed such that they run around only part of the periphery. The annular grooves are preferably arranged in the device carrier and/or the machine base; preferably, the reference plate has such annular grooves.

By means of these annular grooves, a radial reference of the components arranged in these annular grooves, or received by them, can be established in an easy manner in relation to the annular table or in relation to the upper machine part, and consequently also indirectly in relation to the machining units. The different distances in relation to the axis of rotation allow correspondingly different radial references to be established. The annular grooves make a simplified construction possible and quick assembly of components, in particular of the workpiece receiving devices.

Alternatively or additionally, the circular table, in particular the device carrier, and/or the machine base, in particular the reference plate, may also have threaded holes and locating holes or the like for establishing radial references.

In a preferred embodiment, the device carrier is of a multipart form and has a number of device carrier elements, which can be arranged and assembled individually and separately from one another on a rotatable part of the annular table. In this way, a flexible construction of the device and quick and easy changing of the workpiece receiving devices are possible. The workpiece receiving devices may be preassembled separately and independently of one another outside the device on the individual device carrier elements. For exchanging a workpiece receiving device, only the associated device carrier element with preassembled workpiece receiving device is then exchanged in each case. If the device carrier elements have corresponding threaded holes, locating holes and/or annular grooves, the workpiece receiving device may be preassembled in an already aligned manner, in particular in the radial direction.

The device carrier elements may be in the form of ring segments, which can be put together or combined as required to form a complete closed device carrier ring, but may also be assembled individually or in small groups.

Device carrier elements may also have the form of simple rectangular plates or other forms. Device carrier elements are generally plate-shaped elements, but this is not obligatory.

In a development, the upper machine part has above the upper column region a substantially horizontally arranged installation plate. The installation plate is preferably formed in a self-supporting manner and for arranging units. It preferably extends in the radial direction beyond a machining region that is the region intended for arranging the machining units and for machining the workpieces. Units required for the device, for example pumps or compressors, may be arranged on the installation plate in an installation region that is located above this installation plate. The installation plate may also be formed for guiding and mounting doors and/or cubicle walls.

The installation plate may in this case be arranged directly on the column itself, or else on a column top, which serves for extending the column in the upward direction.

In an advantageous refinement, the column is formed in a hollow manner and forms a supply shaft. If there is a column top, this is likewise preferably hollow. By means of the hollow column, feed lines, such as for example electrical lines or supply lines for media (compressed air, cooling lubricant or the like) can be led from the units and/or components arranged in the installation region into the column and from the inside to the machining units arranged on the column. If the device is designed correspondingly with a clearance in the upper side of the machine base, the lines may also be led through the column to components which are arranged below the base reference area or below the annular table in the machine base. The inner space of the column is in this case preferably divided into at least two shafts, of which in particular one is intended only for the lines for supplying media and one is intended only for electrical lines. The two shafts are preferably separated from one another by a separating wall.

In a preferred refinement, the device has devices for providing a seal against the ingress of liquids, dust and/or chips from above, from the machining region into the region that is located below the base reference area. In this way, the region below the base reference area can be classified as a "dry region".

If a region is correspondingly sealed off, in particular against the ingress of liquids such as cooling lubricants or cleaning liquids, it may be classified as a "dry region", which offers advantages in the design of the units and components intended to be arranged in this region with regard to their protection classes.

In a preferred refinement, the device has devices for providing a seal against the ingress of liquids, dust and/or chips from below, from the machining region into the installation region. Correspondingly, the installation region above the installation plate can likewise be classified as a "dry region".

If both the installation region and the region below the base reference area are designed as a "dry region", only the machining region is a "wet region", the wet region being bounded in the upward direction by the installation plate and in the downward direction by the machine base or the reference plate.

In an advantageous refinement, a carrying arm device that is preferably pivotable or rotatable about the axis of rotation and is intended for an operator control panel is arranged on the upper side of the installation plate.

In an advantageous refinement, the device has on the upper side of the installation plate a transporting device for transporting the upper machine part and/or the entire device. This transporting device is preferably fastened to the installation plate and designed such that the upper machine part and/or the entire device can be received on it, for example with the aid of a crane.

The aforementioned device may be produced by the annular table first being arranged and positioned on the machine base and fixed in its position on the machine base. Subsequently, the upper machine part may be arranged and positioned on the machine base and correspondingly fixed in its position. The annular table and the upper machine part may be aligned and assembled on the machine base independently of one another, that is to say as it were autonomously. In this way, independent pre-assembly of the annular table and the upper machine part is also possible.

In order to replace a defective annular table or exchange the drive of the annular table, in the case of a device according to the disclosure it is no longer necessary to separate the column with the machining units arranged thereon and the annular table from the machine base in order to be able in the first place to disassemble the annular table from the column and replace the corresponding parts. Furthermore, the device according to the invention can avoid changing of the distance between the plane of the annular table and the machining units, and correspondingly the distance dependent thereupon in the vertical direction between the workpiece receiving devices and the corresponding machining tool, during the renewed assembly.

After fixing its position on the machine base, the annular table is preferably joined together with the machine base to form a machine substructure. In particular, the annular table is screwed to the machine base.

Once it has been fixed in the correct position on the machine base, the upper machine part is preferably joined together, preferably screwed, with the annular table and/or the machine base. It is not necessary for the annular table, to be connected to the upper machine part. However, under some circumstances this may be advantageous.

The honing machine is designed as an annular-table honing machine and comprises at least one machining unit equipped with a tool spindle for honing and an aforementioned device described above and below. The machining unit is attached to the column. The column preferably carries two or more machining units distributed over the circumference of the column. In addition to machining units that are set up for honing, other machining units may be provided, for example for deburring. Furthermore, additional measuring units may be provided.

These and further features emerge not only from the claims but also from the description and the drawings, where the individual features can be realized in each case by themselves or as a plurality in the form of subcombinations in an embodiment of the invention and in other fields and can constitute advantageous and inherently protectable embodiments. Embodiments of the invention are schematically illustrated in the drawings and are explained in more detail below.

DETAILED DESCRIPTION OF THE PREFERRED EMBODIMENTS

Figure 1:
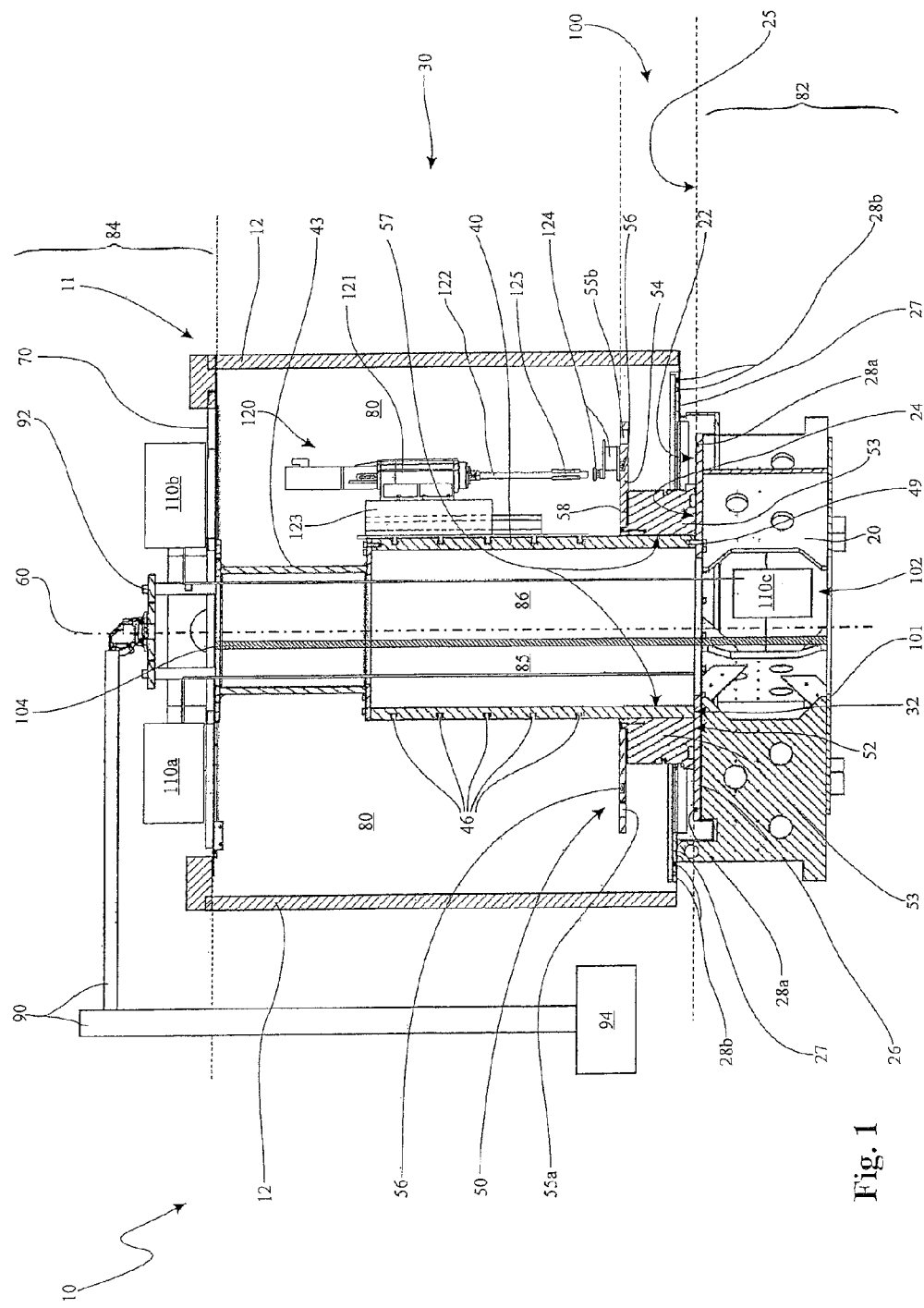
FIG. 1 shows in a sectional representation an exemplary embodiment of an annular-table honing machine according to the invention.

FIG. 1 shows in a sectional representation an exemplary embodiment of an annular-table honing machine 10 according to the invention with a device 11 for honing. The device 11 comprises an upper machine part and a machine substructure 100 with a machine base 20 and an annular table 50. The upper machine part 30 and the annular table 50 are respectively arranged with their undersides 32, 52 directly on an upper side 22 of the machine base 20 and are mounted fixedly in place on the machine base. The upper machine part 30, arranged on the machine base 20, comprises a cylindrical, round, hollow column 40 with a column underside which serves as a reference area of the upper machine part 30 and forms the underside 32 of the upper machine part 30.

The machine base 20 has on its upper side 22 a planar base reference area 24, by which both the vertical position of the circular table 50 and the Vertical position of the upper machine part 30 are determined, so that the upper machine part 30 is vertically aligned and positioned in relation to the annular table 50. The base reference area 24 in this case forms the only reference area for the vertical alignment of the upper machine part 30 in relation to the circular table 50 and lies in a reference plane 25. The base reference area 24 supports both the annular table 50 and the upper machine part 30 independently of one another. For the vertical alignment of the upper machine part 30 in relation to the annular table 50, no other reference areas other than the base reference area 24 are necessary or provided for the basic construction of the device 11.

The annular table 50 is arranged in the form of a ring around the outside of the column 40 in a lower column region. The annular table has a rotationally stationary part or stator 53 and a rotatable part or rotor that can rotate with respect to this stator. The stator has an upwardly open; substantially rectangular, U-shaped cross section. The annular rotor closes off the upper opening. Accommodated, inter alia below the rotor, within the U-shaped peripheral trough formed by the stator, are the drive for the rotor, the measuring system for determining the angular position of the rotor, the bearings (rotary bearings, radial and axial bearings) and braking devices.

Detachably fastened, by means of screws or the like, to the upper side of the rotatable part or rotor is an exchangeable device carrier 54 of a multipart construction. The device carrier is intended for receiving workpiece receiving devices 124 and, when the device is fully assembled, may be regarded as part of the circular table.

The annular table 50 is not suspended on the column 40, but is exclusively supported by the machine base 20, or as it were "stands" on it. The device carrier 54 is fastened to the rotor of the annular table, which is mounted in a rotationally movable manner about the vertical axis of rotation 60 with respect to a rotationally stationary part 53 of the annular table 50 by means of a rotary bearing in the form of a rolling bearing or plain bearing. The rotary bearing is advantageously a precision rotary bearing, for example in the form of an axial rolling bearing.

Between the radial inner surface of the rotationally stationary part 53 of the annular table 50 and an outer surface of the column 40 in the lower column region, the device 11 has a transition fit 57, so that the annular table 50 is aligned in the radial direction in relation to the upper machine part 30 and in relation to the column 40. The transition fit 57 is understood as meaning a fit where both play and oversize may occur as a result of the tolerances. The fit 57 between the column and the annular table in the radial direction is preferably an h or H fit.

The column 40 has at various heights on its outer side 44 a total of five horizontally running annular grooves 46, which are formed such that they run around the entire periphery and have milled recesses, which are formed for subsequently pushing in fastening elements for receiving machining units. In FIG. 1, one machining unit 120 of a number of machining units for internal cylindrical honing is represented by way of example.

The machining unit 120 is arranged within a machining region 80 and has a honing spindle 122 with a honing tool for internal cylindrical honing with radially adjustable honing sticks 125. Furthermore, the machining unit 120 comprises a honing spindle housing 121 with an integrated drive for producing a rotational movement of the honing spindle 122 or of the honing tool about its longitudinal axis. For producing a lifting movement of the honing tool 122 in the longitudinal direction, a linear drive 123 is provided. For receiving the workpieces to be machined, a workpiece receiving device 124 is fastened on the device carrier 54.

The annular grooves 46 incorporated on the outside of the column 40 make; it possible for the machining units to be freely divided up or arranged in the circumferential direction with an angular division that can be flexibly set. This means that the number of machining units can be flexibly varied and uniform intermittent operation with uniform angular offsets is nevertheless possible. For example, three machining units may be arranged on the circumference of the column, in each case with an angular offset of 120° between them or else five machining units with in each case an angular offset of 72°. Furthermore, fitting at different heights or different positions in the vertical direction is similarly possible, as is the use of machining units of different lengths. A measuring unit that is not represented is provided between two machining units.

The common base reference area 24 allows the annular table 50 to be assembled on the machine base 20 independently of the upper machine part 30 with the column 40 and the machining unit 120 fastened thereto. Correspondingly, the upper machine part 30 can be assembled separately. In particular, the machining unit 120 can be assembled on the column 40 independently of the annular table. During its assembly, only a vertical reference in relation to the column underside or in relation to the underside 32 of the upper machine part 30 has to be established, but no direct vertical reference in relation to the annular table 50. This is obtained automatically when the device 11 is assembled.

The machine base 20 has a plane-parallel reference plate 26, the upper side of which forms the base reference area 24. For this purpose, the upper side of the reference plate 26 is machined in such a way that the base reference area 24 is a planar area. Incorporated on the upper side of the reference plate 26 at a defined distance outwardly in the radial direction in relation to the axis of rotation 60 and in relation to the column 40 is an annular groove 28a, which makes further, radially referenced fittings below the device carrier 54 possible. In this case, the annular groove 28a serves as a positioning and aligning aid.

The device 11 represented in FIG. 1 has a further plate or an annular plate 27, which is likewise mounted fixedly in place on the machine base 20. This plate extends outwardly in the radial direction beyond the reference plate 26 and likewise has annular grooves 28b, which likewise serve for establishing further radial references in relation to the vertical axis of rotation 60. However, the annular plate 27 is not arranged in the same plane as the reference plate 26, but is offset in the upper direction in relation thereto. This step-shaped arrangement makes it possible to provide devices for receiving components at predefined positions both in the vertical direction and in the radial direction in an easy manner. To optimize the use of raw materials and reduce the production steps, the reference plate 26 may be produced together with the annular plate 27 from a single semifinished product, the reference plate 26 forming an inner ring in relation to the annular plate 27.

Figure 2:
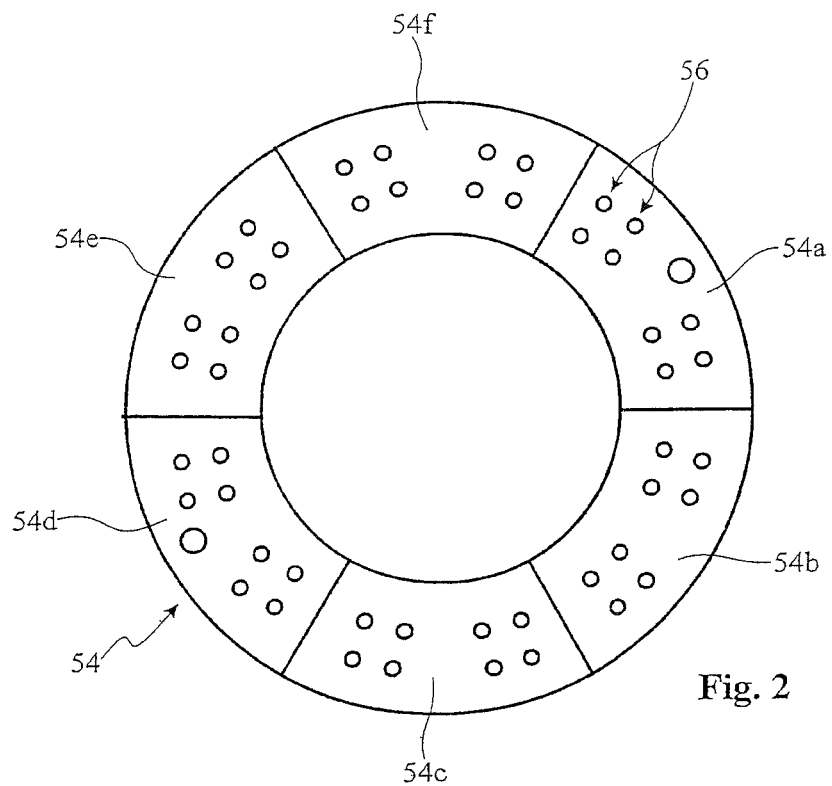
FIG. 2 shows a device carrier from FIG. 1, segmented in six ring segments, in an illustration of the individual parts.

Incorporated in the upper side of the device carrier 54 of the annular table 50 are devices 56 for easy positioning of components in the radial direction in a predefined radial position (see FIG. 2). The devices 56 are formed for receiving the workpiece holding devices. In the case of the example, each of the devices has four threaded holes and locating holes, lying in a square drilling pattern, for a predefined arrangement position of components on the device carrier 54.

FIG. 2 shows a segmented device carrier 54 formed in a multipart manner, which has six individual plates or ring segments 54a to 54f, which make up a ring. The ring segments can be assembled separately in each case and can be produced with low production costs. The ring segments 54a to 54e may also be divided Into further segments. The altogether ring-shaped device carrier may be designed, for example, as a two-part, three-part, four-part, six-part or twelve-part ring. Furthermore, it is conceivable to arrange a further segment or a second device carrier in a radially offset manner on the device carrier 54 or on one of the segments of the device carrier 54a to 54f. In the case of the example, each segment has two square drilling patterns.

A special arrangement of threaded holes and locating holes in the rotor of the annular table 50, comparable to the locating holes 55a and 55b in the device carrier 54, allows each ring segments 54a to 54f to be assembled or disassembled independently of the others. The radial references in relation to the upper machine part 30, in particular in relation to the machining unit 120, are defined by way of locating holes in the annular table 50. The references remain, or can be easily re-established, even when the device carrier 54 with the workpiece receiving device 124 arranged thereupon is exchanged. Device changes can be performed easily and effortlessly by not only the workpiece receiving device 124 but also the device carrier 54 or the ring segments 54b associated with the workpiece receiving device 124 being exchanged. Consequently, the workpiece receiving devices can be easily and quickly changed according to the application.

Figure 3:
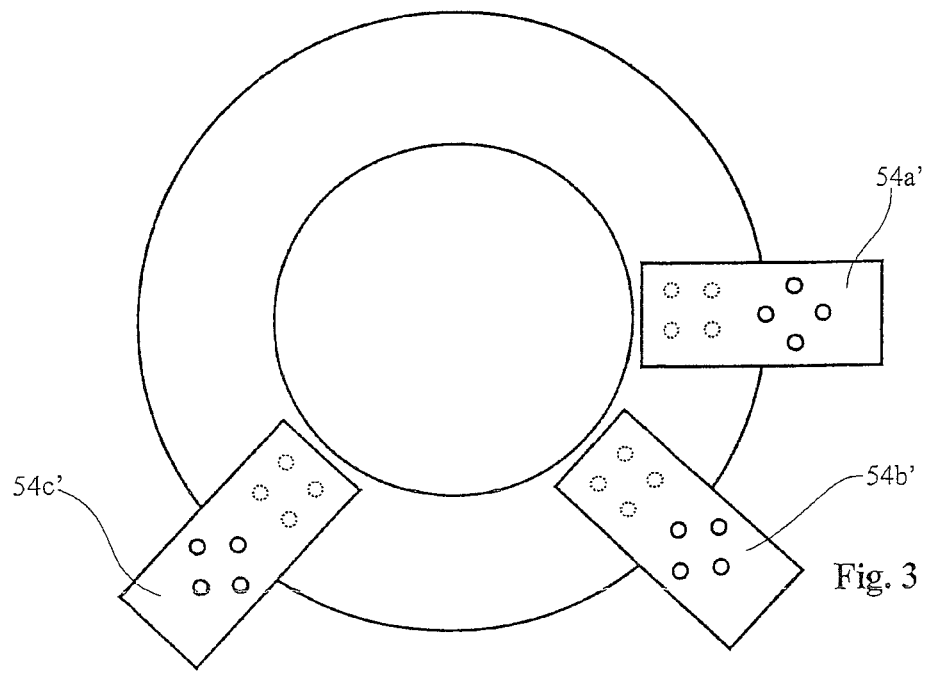
FIG. 3 shows a device carrier with three device carrier elements in the form of rectangular plates.
Figure 4:
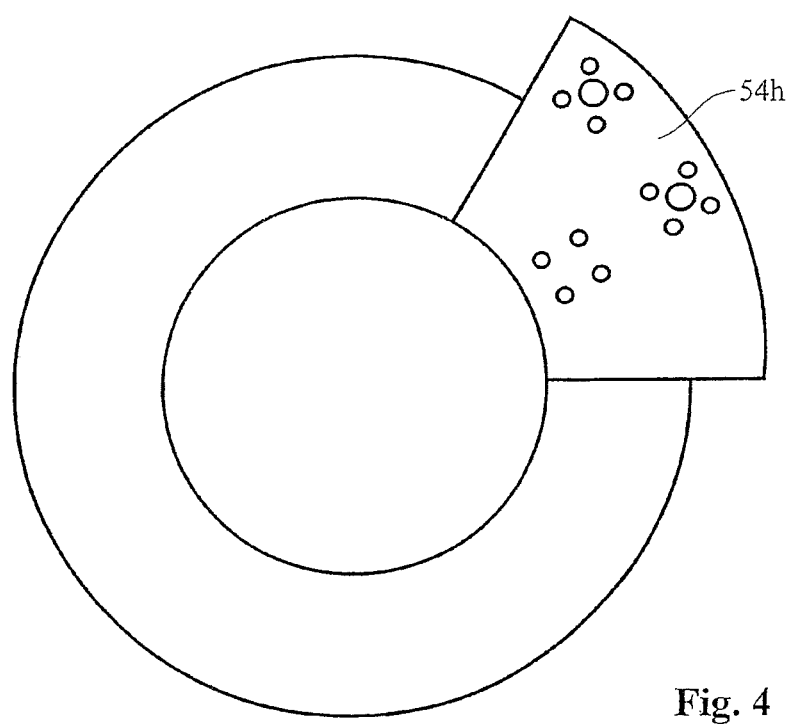
FIG. 4 shows an annular table with an individual ring segment as a device carrier.

FIGS. 3 and 4 show by way of example other embodiments of multipart device carriers. FIG. 3 shows a device carrier with three device carrier elements in the form of rectangular plates 54a', 54b', 54c', which can be produced very easily and inexpensively and have in each case a group of holes in order to fasten a workpiece holding device or some other device thereupon. It goes without saying that less or more than three rectangular plates, other or polygonal plates with a uniform or nonuniform division may also be provided. A closed annular form of the device carrier, as shown in FIG. 2, is not necessary. FIG. 4 shows an annular table with a single ring segment 54h as a device carrier, it being possible for a number of workpiece holding devices, for example two, to be fastened on the ring segment.

For driving the device carrier 54, the annular table 50 has a drive (not represented here), which may be formed either as an intermittent drive or as an NC direct drive, i.e. as a stepless, controlled and regulated drive, which can move to any desired position or any angular position. Preferably provided is a direct drive with a torque motor which is rotationally movable in both directions of rotation and, even under high loads, can quickly turn and precisely position the device carrier 54 fastened to the rotor of the annular table. For the positional feedback of the rotational position and for providing position signals as a controlled variable in the electrical control circuit, a direct position measuring system is advantageous. Provided for securing the position in the currentless state is a pneumatic emergency brake, which closes in the currentless state and thereby fixes the device carrier 54 in its position. The position measuring system of the annular table 50 is arranged in the stator of the annular table in such a way that it is externally accessible in the installed state, and thus makes easy calibration possible. The pneumatic brakes are also externally accessible in the installed state, and thus make easy maintenance possible. Furthermore, the annular table 50 may have mechanical standstill brakes of redundant configurations. Coolant distribution and lubricant distribution are preferably integrated in the annular table 50.

With the aid of this drive concept it is possible inter alia to perform intermittent operation with a full cycle, in which a workpiece holding device is transported from one machining station to the next machining station or a measuring station or the like in every cycle. Furthermore, in a corresponding constellation, a device change can also be achieved by assembling not only the number of identical first workpiece holding devices, corresponding in number to the number of machining stations, but also, for example offset by half a cycle therebetween, second workpiece holding devices, which carry workpieces of a different type or the same type in a different chucking setup, and to this extent differ from the first workpiece holding devices. This allows, for example, change-over times for other workpieces to be considerably reduced. Also, multiple cycles can be operated with any desired angular intervals. If two machining spindles are provided at one machining position, it is possible for example to operate with a double cycle. The direction of rotation can in each case be automatically chosen such that the smallest possible angular advancement is performed to reach the next standstill position. Thus, for example, the shortest angular advancement to a calibrating position may be performed. The optimization of the cycle time also has a positive effect on productivity.

Furthermore, here too, drive devices that are not represented may be provided for driving the workpieces to be machined, so that, during the machining, the workpieces can for example be moved in a rotating manner about their own axis. For this purpose there may be provided, for example, workpiece spindles that are preferably arranged below the device carrier 54. The workpiece receiving devices may also be formed as turning and/or pivoting devices and make it possible for a workpiece to be machined in different positions with only one chucking setup. The workpiece receiving device 124 that is represented in FIG. 1, however, is formed for receiving a workpiece while at rest.

Incorporated in the machine substructure 100 or the machine base 20 are holes for line lead-throughs, rows of threads, etc., which may be produced already before the assembly of the machine base 20. In order to reduce the costs and the production effort, apart from the reference plate 26 with the base reference area 24, the individual parts of the machine base, such as for example a base plate 101, are not re-machined. Since the reference in the vertical direction for the construction of the machine is formed only by the base reference area 24, it is possible to dispense with many machining steps and other technical references for the alignment and positioning of the individual components in relation to one another.

Arranging the upper machine part 30 on the base reference area 24 instead of a column extending in the upward direction from the base plate 101 has the effect of providing an installation space 102 below the reference plate 26 in the machine base 20, which space includes the region below the column and can be used for arranging units and/or components 110*c*, such as for example compressed-air units or pumps.

Arranging devices that are not represented here for providing a seal against the ingress of liquid, dust and/or chips in a region 32 below the base reference area 24 allows this region 82 to be kept "dry" and consequently, if the sealing devices are correspondingly designed, to be classified as a dry space. This is advantageous in particular for arranging electrical units 110*c*, since the requirement for the protection classes of these unit's 110*c* can consequently be reduced.

The machining region 80, on the other hand, can be used as a wet region, so that media such as cooling lubricants, cleaning liquids, flushing liquids, etc. can be used. A separation into a wet space and a dry space is advantageous in particular with regard to the arrangement of electrical units and components 110*a* to 110*c*. Since the annular table 50 is in the machining region 80, and consequently in the wet region, it is specially sealed off and meets the requirements with regard to protection classes to the degree of protection IP 67.

The exemplary embodiment represented in FIG. 1 has above the column 40 a likewise round, hollow-formed column top 43 to increase the height of the machine, in particular to extend the machining region 80 in the upward direction. The column top 43 allows the required height of the machining region 80 to be adapted in an easy and inexpensive manner. The outer and inner surfaces of the column top 43 likewise do not necessarily have to be machined, since there are no special requirements for their surface finish. On the other hand, it is necessary in the case of the column 40 to incorporate the annular grooves and possibly pre-machine the surface correspondingly for a firm seating of the machining units. If the lacking height is made up by means of the column top 43, different machine heights can be realized with low costs, since it is no longer necessary to keep in stock different, laborious-to-machine columns 40 for different machine heights.

Assembled on the column top 43 is an installation plate 70, on which units and components 110*a* and 110*b* can be installed. The installation plate 70 separates an installation region 43, located above the installation plate 70, from the machining region 80 lying therebelow. The installation region 84 offers space for electrical and pneumatic units and components 110*a* and 110*b* and also for fittings of media feeds etc. and laying of cables and access from above into the column 40 and the column top 43. The installation region 84 can likewise be formed as a dry region, by providing corresponding devices for providing a seal against liquids, dust and/or chips that could enter the installation region 84 from the machining region 80.

The column 40 and the column top 43 are formed such that they are hollow on the inside and as a supply shaft 85, 86, so that the entire power supply to the machine can in principle take place from above, to be precise with a common access radially to the side within the installation region 84 and from there through the column 40 downward into the dry region 82 below the base reference area 24 to the units and components 110*c* arranged there. There may correspondingly be branches to further components in the radial direction, which may be arranged on the outer side 44 of the column 40 in the upper column region 42, for example to the annular table 50 or to the machining unit 120. Within the column 40 there may be incorporated a separating wall 104, which separates the supply shaft into a shaft for arranging electrical feed lines 85 and a shaft 86 for feeding in and discharging media. This division may also recur in the installation region 84 above the installation plate 70 or else in the region 82 below the base reference area 24.

Fastened to the upper side of the installation plate 70 is a transporting device 92 or a suspension device, with which the entire upper machine part 30 or the entire device 10 can be picked up and transported, for example by means of a crane. Furthermore, in the case of the exemplary embodiment represented, arranged on the installation plate 70 or on the transporting device 92 is a carrying arm device 90, which is intended for receiving an operator control panel 94. By means of this carrying arm device 90, the operator control panel 94 can be pivoted around the machine by almost 330° about the vertical axis of rotation 60.

The installation plate 70 is configured as a self-supporting structure and is also formed for receiving and arranging cubicle panels and/or doors 12. In this case, the doors 12 are hung or suspended and guided on the installation plate 70. It may be advantageous to provide in the substructure additional guiding elements to prevent swinging of the doors 12. However, the forces of the weight of the doors 12 are preferably taken by the installation plate 70.

In particular in the case of protective doors, the doors 12 are in this case arranged within the device 11 in such a way that their guiding system and their control system are arranged in the installation region 84, which is classified as a dry region. One of the segments may be prepared as a loading station, so that the honing machine can be easily adapted to different handling systems for workpiece feeding and removal, for example to a robot system.

Correspondingly, with sufficient dimensioning of the device 11, the entire device can be transported by means of this transporting device.

The carrying arm device 90 for the operator control panel 94 is arranged centrally on the installation plate 70, preferably in the region of the vertical axis of rotation 60. The pivoting arm makes it possible for the operator to see and operate the machine completely and from all sides, in particular if there are transparent doors 12 or cubicle panels that bound the machining region 80 laterally in the outward direction.

During the assembly of the device 11, first the reference plate 26 with the base reference area 24 is produced and this is arranged on the machine base 20 and correspondingly aligned, in particular with regard to its height in the vertical direction and its inclination in relation to the horizontal. For this purpose, special aligning means that are not represented in the case of the exemplary embodiment shown may also be provided. Subsequently, the annular table 50 may be arranged with its underside 52, which forms the reference area of the annular table 50, on the machine base 20. If the base reference area 24 has been aligned and the annular table 50 has been produced in accordance with the predetermined tolerances, the annular table 50 is consequently automatically aligned in the vertical direction in relation to the machine base 20. The radial alignment or the radial reference in relation to the vertical axis of rotation 60 or the longitudinal axis of the device 11 can be established in an easy manner by means of locating pins.

If the annular table 50 has been correspondingly positioned, its position on the machine base 20 is fixed and it is joined together, for example screwed, with the machine base 20 to form the machine substructure 100. Subsequently, the fully preassembled upper machine part 30 with the column 40, the installation plate 70, units/components 110*a* and 110*b* arranged on the installation plate 70 and also machining units arranged on the column 40 can be arranged as a complete assembly on the machine substructure 100. The underside 32 of the upper machine part 30 is in this case the corresponding reference area for the vertical positioning of the upper machine part 30 in relation to the machine substructure 100, and is arranged correspondingly on the base reference area 24. The radial alignment or the radial reference of the upper machine part or the column in relation to the axis of rotation 60 of the annular table 50 may likewise be established in an easy manner by means of locating pins 49.

Preferably, all of the lines, feed lines and feeds both in the machine substructure 100 and in the upper machine part 30 are preassembled and provided in the respective separating plane with quick-acting couplings, so that, after the upper machine part 30 has been arranged on the machine substructure 100, all that is necessary is for the corresponding lines to be coupled together with their counterparts by means of the quick-acting couplings. This makes it possible for the device 10 to be constructed very easily and quickly, in particular with regard to the alignment and positioning of the individual components in relation to one another.

Repairs can also be accomplished correspondingly easily. In particular, repairs to the annular table 50 can be carried out easily and quickly. Apart from the drive unit of the annular table 50, all of the components of the annular table 50 can be exchanged or maintained in the installed state. In order to exchange the drive of the annular table 50, the annular table 50 has to be removed from the device 11. For this purpose, all that is necessary is to reverse the sequence of the assembly steps and first remove the upper machine part 30 from the machine substructure 100. For this purpose, the lines, feeds etc. must be correspondingly separated at their quick-acting couplings and the column detached from the machine base 20. Subsequently, the upper machine part 30 can be lifted off from the machine base 20, for example by means of a crane together with the transporting device 92. Then, the annular table 50 is exposed and can be repaired and/or exchanged. After the repair, the same references as before can be established in an easy manner (at least in the case of a repair of the annular table).

The invention claimed is:

1. A honing machine comprising:
a device for the mechanical surface machining of workpieces by honing, the device comprising:
a machine base with an upper side,
an upper machine part with an underside,
the upper machine part having a vertical column, which has on its outer surface in an upper column region a number of annular grooves running horizontally at different heights as a device for receiving at least one machining unit for mechanical surface machining that is equipped with a tool spindle,
an annular table with an underside, the annular table being arranged around the column in a lower column region and having a device carrier, which is rotatable about a vertical axis of rotation, for receiving at least one workpiece receiving device,
wherein the annular table and the upper machine part are respectively arranged with their underside on the upper side of the machine base and are mounted fixedly in place on the machine base, and
two or more machining units including at least one machining unit for honing equipped with a tool spindle are distributed over the circumference of the column in an angular division which can be flexibly set, each of the machining units being fastened at a selected circumferential position on the column by fastening elements received in the grooves.

2. The honing machine according to claim 1, wherein the machine base has on its upper side a base reference area and the annular table and the upper machine part are respectively arranged on the base reference area.

3. The honing machine according to claim 2, wherein the upper machine part is arranged and mounted with a column underside on the base reference area of the machine base, the column having for this purpose a column underside which forms the underside of the upper machine part.

4. The honing machine according to claim 2, wherein the machine base has a reference plate on its upper side and an upper side of the reference plate at least partially forms the base reference area.

5. The honing machine according to claim 1, wherein the device has a fit between the upper machine part and the annular table in the radial direction.

6. The honing machine according to claim 5, wherein the fit is a transition fit.

7. The honing machine according to claim 1, wherein the annular grooves are formed such that they run around the periphery of the column.

8. The honing machine according to claim 1, wherein at least one of the annular table and the machine base has at different radial distances in relation to the axis of rotation devices for at least one of receiving and positioning components.

9. The honing machine according to claim 1, wherein the device carrier is of a multipart construction and has a number of device carrier elements.

10. The honing machine according to claim 9, wherein the device carrier elements are designed as ring segments or rectangular plates.

11. The honing machine according to claim 1, wherein the upper machine part has above the upper column region an installation plate for arranging units, the installation plate extending in the radial direction beyond a machining region, the machining region being the region that is intended for arranging the machining units and for machining the workpieces.

12. The honing machine according to claim 1, characterized in that the column is hollow.

13. The honing machine according to claim 1, wherein the device has devices for providing a seal against the ingress of liquids, dust and/or chips from above, from the machining region into a region that is located below the base reference area.

14. The honing machine according to claim 11, wherein the device has devices for providing a seal against the ingress of liquids, dust and/or chips from below, from the machining region into a region that is located above the installation plate.

15. The honing machine according to claim 11, wherein a carrying arm device for an operator control panel is arranged on the installation plate.

16. The honing machine according to claim 11, wherein a transporting device for transporting at least one of the upper machine part and the entire device is fastened to the installation plate.

17. The honing machine according to claim 1, wherein the column carries two or more machining units for honing distributed over the circumference of the column.

18. The honing machine according to claim 1, wherein the column carries at least one of a deburring unit and a measuring unit in addition to machining units for honing.

* * * * *